Aug. 23, 1949.                    J. KOCHIS                    2,480,032
                                 TRANSMISSION
Filed March 28, 1946                                      3 Sheets-Sheet 1

Inventor
JOHN KOCHIS.

By *Clarence A. O'Brien and Harvey B. Jacobson*
                                              Attorneys Aug. 23, 1949.    J. KOCHIS    2,480,032
TRANSMISSION Filed March 28, 1946    3 Sheets-Sheet 2

Inventor

JOHN KOCHIS.

By Clarence A. O'Brien
and Harvey B. Jacobson
Attorneys

Aug. 23, 1949.  J. KOCHIS  2,480,032
TRANSMISSION
Filed March 28, 1946  3 Sheets-Sheet 3
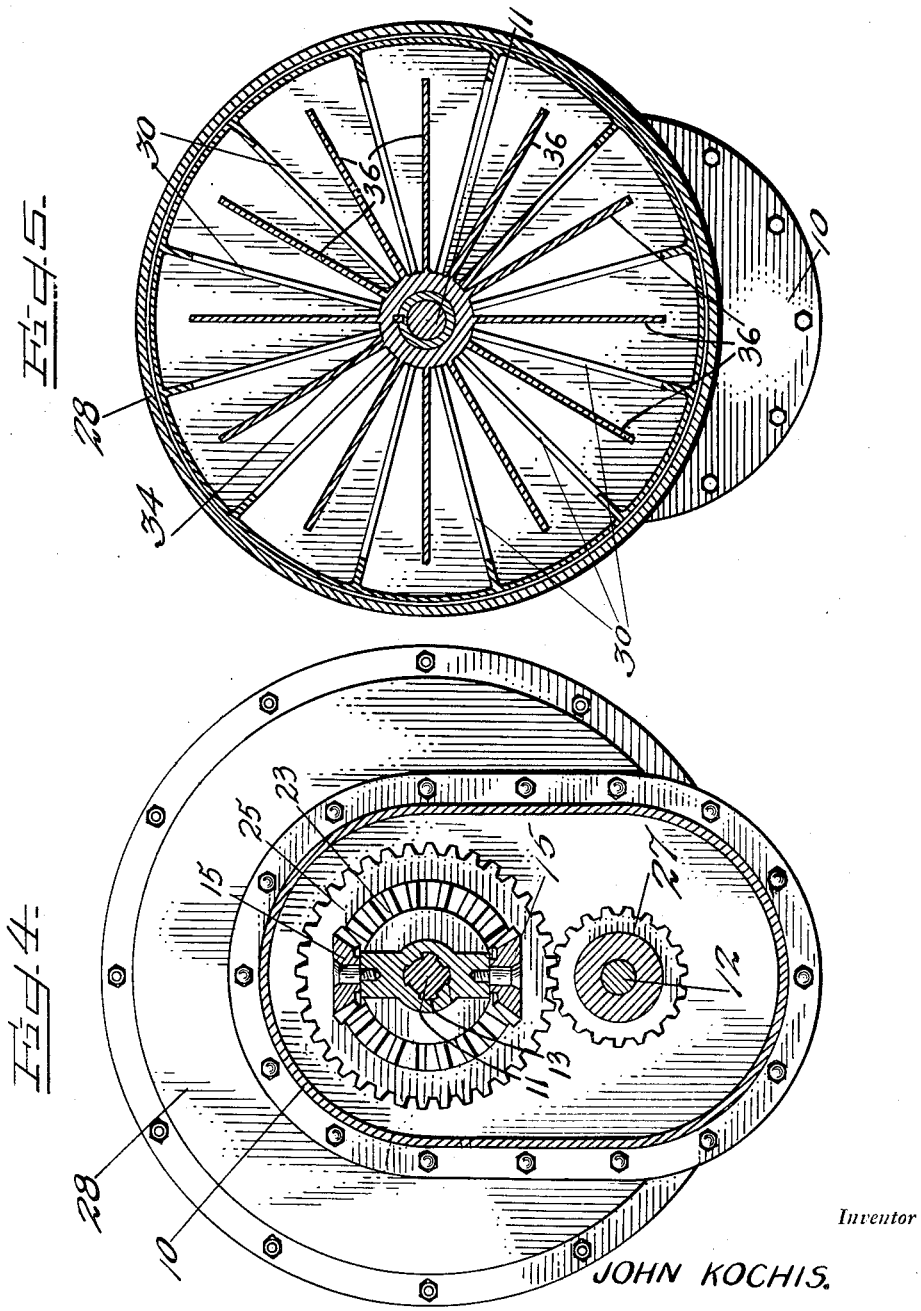
Inventor
JOHN KOCHIS.
By Clarence A. O'Brien
and Harvey B. Jacobson
Attorneys Patented Aug. 23, 1949

2,480,032

UNITED STATES PATENT OFFICE 2,480,032

TRANSMISSION

John Kochis, Staten Island, N. Y.

Application March 28, 1946, Serial No. 657,778

1 Claim. (Cl. 74—682)

This invention relates to a transmission and more particularly to a power transmission.

The primary object of the invention is to establish between a driven shaft and a drive shaft, a driving connection having an infinite number of speeds within the limits of the device.

Another object is automatically to govern the speed of rotation of the driven shaft according to the load applied thereto, and automatically to regulate the torque applied to the driven shaft to overcome the effects of the load thereon.

Among its features my invention embodies a drive shaft, a driven shaft, a spider mounted on and driven in unison with each shaft, planetary pinions carried by each spider, gears rotatably mounted on each shaft on each side of each spider, said gears meshing with the planetary pinions, a pinion on each shaft rotatable in unison with one of the gears on each side of each spider and a gear on each shaft on each side of each spider rotatable in unison with a gear meshing with the planetary pinions and having meshing engagement with the pinion on the other shaft.

Other features include braking means operative automatically to retard or arrest rotation of one of the last-mentioned gears.

Figure 1:
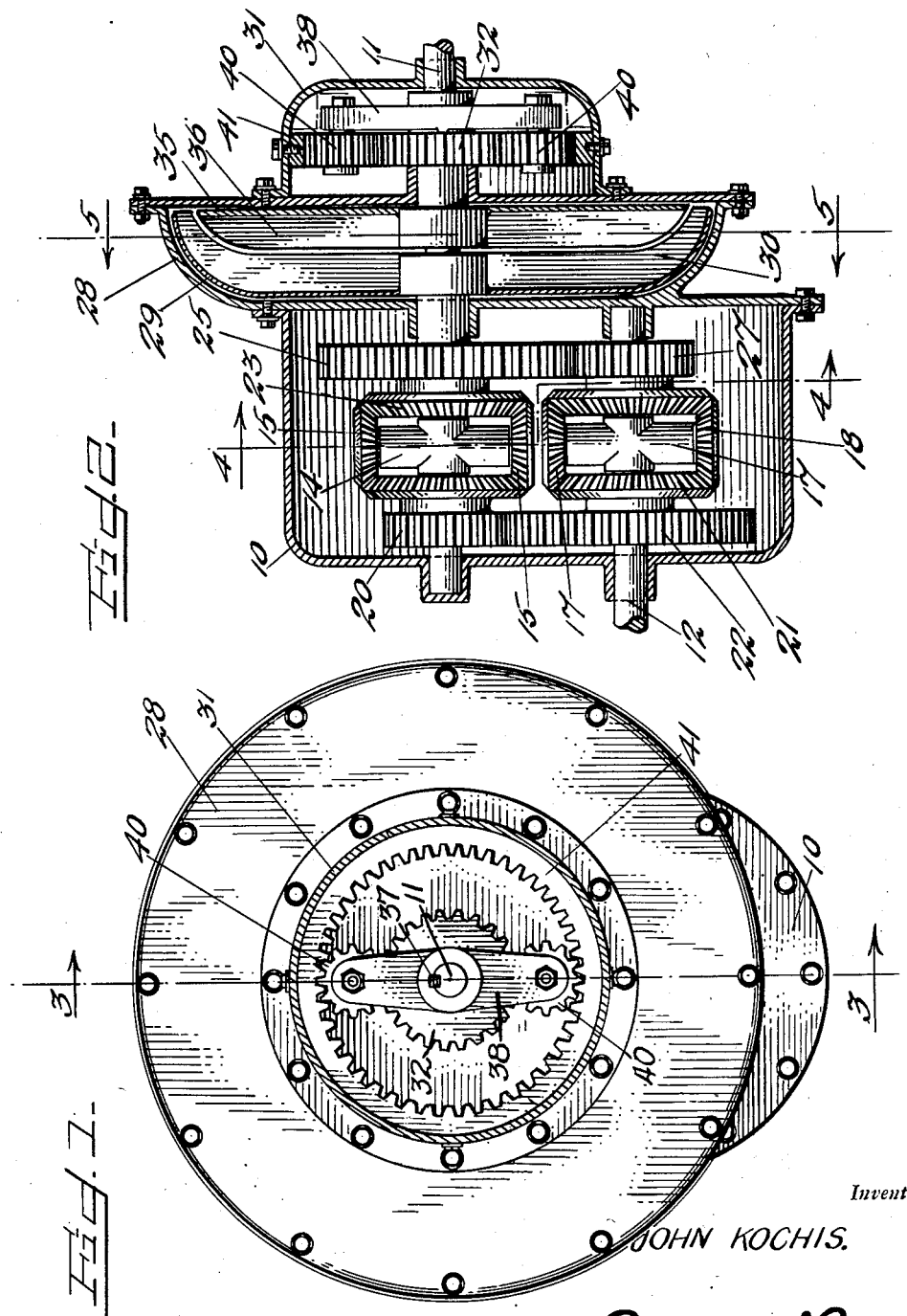
Figure 1 is a rear view of a transmission embodying the features of this invention, certain portions of the casing being broken away to more clearly illustrate certain features of the construction.
Figure 2:
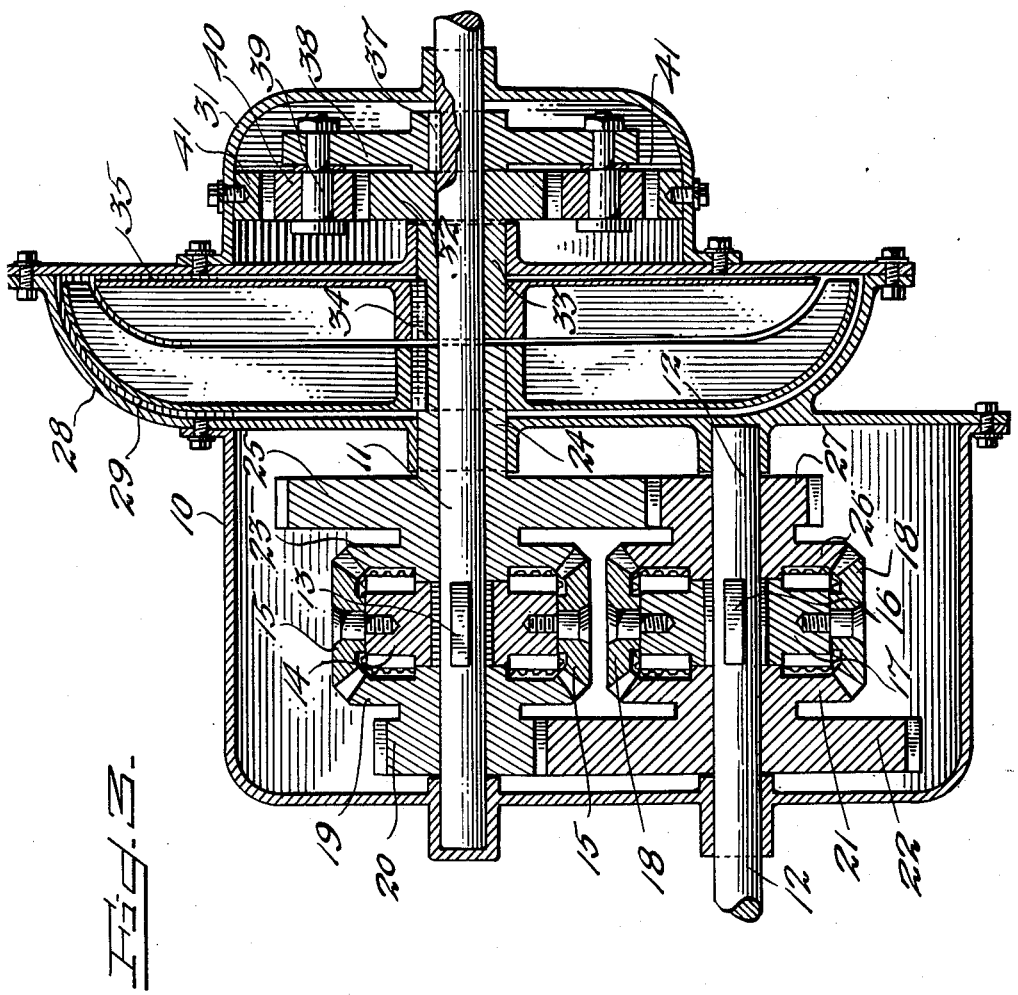
Figure 2 is a vertical sectional view through Figure 1.

Figure 3 is an enlarged sectional view taken substantially on the line 3—3 of Figure 1, Figure 4 is a sectional view taken substantially along the line 4—4 of Figure 2, and Figure 5 is a transverse sectional view taken substantially along the line 5—5 of Figure 2.

Referring to the drawings in detail my improved transmission is housed within a casing 10 in which a drive shaft 11 is mounted to rotate. A driven shaft 12 is rotatably mounted in the casing 10 in spaced parallel relation to the shaft 11 and splined as at 13 to the shaft 11 is a spider 14 carrying radial arms up on which bevelled pinions 15 are mounted to rotate. Splined as at 16 to the shaft 12 is a spider 17 having radial arms upon each of which is rotatably mounted a bevelled pinion 18, and these spiders are arranged to operate in aligned planes perpendicular to their respective shafts 11 and 12.

Rotatably mounted on the shaft 11 on one side of the spider 14 is a bevelled gear 19 which has meshing engagement with the pinions 15, and carried by the hub of the gear 19 for rotation in unison therewith is a spur pinion 20. A bevelled gear 21 is rotatably supported on the shaft 12 in alignment with the bevelled gear 19 and has meshing engagement with the bevelled pinions 18 as will be readily understood upon reference to Figures 2 and 3. The hub of the gear 21 carries a spur gear 22 which is rotatable in unison with the gear 21 and has meshing engagement with the spur pinion 20 previously referred to. It will thus be seen that when rotation of the pinions 15 is retarded or arrested the gear 19 will be driven in unison with the drive shaft 11 so as to transmit power to the gear 22 through the medium of the pinion 20, thus causing the shaft 12 to rotate. Rotatably mounted on the side of the spider 15 opposite the bevelled gear 19 is a bevelled gear 23 which has meshing engagement with the pinions 15 and is provided with an elongated hub 24 carrying a spur gear 25 which rotates in unison with the bevelled gear 23. As will be readily understood upon reference to Figure 3 the hub 24 extends through the end wall of the housing 10 and enters an hydraulic chamber to be more fully hereinafter described. A bevelled gear 26 is rotatably mounted on the shaft 12 on the side of the spider 17 opposite the gear 21 and has meshing engagement with the pinions 18. The hub of the gear 26 is provided with a spur pinion 27 which has meshing engagement with the spur gear 25 as will be readily understood upon reference to Figures 2 and 3. It will thus be seen that as the shaft 11 is driven and a load is applied to the shaft 12 power will be transmitted from the shaft 11 to the spider 14 and thence through the pinions 15 to the bevelled gears 19 and 23 with the result that driving energy will be transmitted through the pinion 20, gear 22 and gear 21 to the pinions 18 to cause the spider 17 to turn and drive the shaft 12. Due to the retarding action of the gear 26 to the rotation of the pinions 18 by reason of its meshing engagement with the gear 25 it will be apparent that the gear 23 will be retarded and consequently considerable torque will be applied to the shaft 12 to move the load. As the momentum of the load increases, the speed of rotation of the shaft 12 will increase, thus offering less resistance to rotation of the gear 23 and causing the speed of the shafts 11 and 12 to more nearly approach one another.

While the transmission will function as above described I have found it desirable to employ additional braking means on the gears 19 and 20 and to this end I employ the hydraulic mechanism to be more fully hereinafter described.

Attached to the case 10 is a casing 28 into which the hub 24 of the gear 23 projects about the shaft 11. The case 28 is adapted to contain hydraulic fluid, and keyed or otherwise secured to the hub 24 within the case 28 is a vaned rotor 29 carrying radial vanes 30. Rotatably mounted on the shaft 11 within a housing 31 on the side of the housing 28 opposite the housing 10 is a spur gear 32 the hub 33 of which extends into the housing 28 and keyed or otherwise secured thereto as at 34 is an impeller 35 having radial vanes 36.

Keyed or otherwise secured as at 37 to the shaft 11 is a spider 38 carrying studs 39 on which pinions 40 are rotatably mounted. These pinions mesh with the spur gear 32 and also with an internal ring gear 41 which is fixed to the housing 31 as illustrated in Figure 3. It will thus be seen that as the shaft 11 is rotated the spider 38 will rotate in unison therewith and cause the pinions 40 to move in an orbit concentrically about the axis of the shaft 11. Due to their meshing engagement with the internal ring gear 41 it will be obvious that the pinions 32 will be rotated so as to drive the impeller 35 at a speed greater than the speed of rotation of the shaft 11, it being understood that the gear trains 32, 40 and 41 are so designed as to cause the impeller 35 to rotate at such speed. Rotation of the impeller 35 will tend to rotate the rotor 29 and hence the gears 25 and 23 in the direction of rotation of the shaft. Since acceleration of gears 25 and 23 makes the pinions 15 tend to rotate gear 19 in a direction reverse to the direction of rotation of the shaft 11 it will be obvious that a braking effect will be produced on the gear 19, thus imparting a relatively high speed of rotation to the gear 23 and pinion 25 so as to drive the pinion 27 at increased speed and hence transmit the power through the pinions 18 and spider 17 to the shaft 12. Obviously as the speed of the shaft 12 approaches that of the shaft 11, the transition will take place smoothly and without jerk or jolt. It is also obvious that an infinite number of speed ratios may be had between the shafts 11 and 12 and that the torque applied to driven shaft 12 will be inverse to the speed of rotation thereof.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

In a transmission a drive shaft, a driven shaft, a spider mounted on and driven in unison with each shaft, planetary pinions carried by each spider, gears rotatably mounted on each shaft on each side of each spider, said gears meshing with said planetary pinions, a pinion on each shaft rotatable in unison with one of the gears which meshes with said planetary pinions, a relatively large gear on each shaft, said large gears being on opposite sides of the spiders and rotatable in unison with a gear meshing with the planetary pinions and having meshing engagement with the oppositely disposed pinions on the other shaft, a planetary gear train driven by the drive shaft, and hydraulic means coupled to the last mentioned planetary train, said hydraulic means having one element coupled to the planetary train and a second element coupled to one of the aforementioned large gears to automatically retard rotation of said last-mentioned large gear.

JOHN KOCHIS.

REFERENCES CITED

The following references are of record in the file of this patent:

UNITED STATES PATENTS

| Number | Name | Date |
|---|---|---|
| 1,039,879 | Armstrong | Oct. 1, 1912 |
| 2,181,118 | Burner | Nov. 28, 1939 |
| 2,360,259 | Murray | Oct. 10, 1944 |